United States Patent Office 3,743,595
Patented July 3, 1973

3,743,595
DUAL-LAYER HYPERFILTRATION MEMBRANE
AND PROCESS FOR USING SAME
James S. Johnson, Jr., Oak Ridge, Tenn., assignor to the
United States of America as represented by the United
States Atomic Energy Commission
No Drawing. Filed Apr. 20, 1971, Ser. No. 135,763
Int. Cl. B01d 13/00
U.S. Cl. 210—23
4 Claims

ABSTRACT OF THE DISCLOSURE

Dual-layer hyperfiltration membranes made by coating a hydrous oxide membrane with an organic polyacid such as polyacrylic acid followed by an acid wash behave more reproducibly than polyacid membranes formed in the absence of the hydrous oxide and, unlike hydrous oxide membranes, operate best in the pH range most commonly found in saline waters.

BACKGROUND OF THE INVENTION

The invention described herein was made in the course of, or under, a contract with the U.S. Atomic Energy Commission and under research agreement with the Office of Saline Water.

The present invention relates to a dual-layer hyperfiltration membrane for use in the recovery of water from saline sources.

The process of hyperfiltration, or reverse osmosis, as well as methods for the formation of dynamically formed hyperfiltration membranes, is well documented in the technical and patent literature; see, for example, Chapter 8 of Principles of Desalination, Academic Press, 1966, and U.S. Pats. Nos. 3,413,219 and 3,449,245. Dynamically formed membranes are created by circulating, under pressure, a feed containing various well known membrane-forming additives through a porous substrate. Among the more useful additives for this purpose are colloidal hydrous metal oxides formed by contacting a porous face of a substrate containing micron-size pores with an aqueous solution containing colloidal particles formed from a salt of a polyvalent metal capable of forming a hydrous metal oxide selected from the group consisting of zirconium(IV), thorium(IV), iron(III), tin(IV), aluminum(III), and hafnium(IV), or from a solution of naturally occurring and synthetically produced polycarboxylic acids. Hydrous oxide membranes, when operated at optimum pH values, i.e., in acid solution, have been found to form rather easily on a rather wide variety of porous supports and have usefully high rejection and fluxes. With hydrous oxide membranes, however, best salt rejections are found at high anion exchange capacities which occur at acidities higher than are found in most natural saline waters. In addition, hydrous oxide membranes are prone to be poisoned by polyvalent anions such as sulfate.

In recent years, organic polyelectrolytes, particularly polycarboxylic acids such as polyacrylic acid (S. B. Sachs, W. A. Baldwin, and J. S. Johnson, Desalination 6, 215 (1969)), have found favor for use as a hyperfiltration membrane because the pH of their optimum performance frequently matches acidities of natural brackish waters. However, there have been certain disadvantages. Product water fluxes are usually lower than other members of the dynamic membrane-forming class, and the presence of polyvalent counterions such as $Ca^{++}$ and $Mg^{++}$ in feeds reduces their effectiveness. A more serious disability is concerned with obtaining reproducible performance. Difficulty has been experienced in forming polyacrylate membranes directly on porous supports and, even when they are successfully deposited, they show unstable and irreproducible performance in terms of salt rejection.

SUMMARY AND DESCRIPTION OF THE INVENTION

The present invention is predicated on the discovery of a way of eliminating or at least considerably reducing the disadvantages of each of the aforementioned hyperfiltration membrane-forming reagents while retaining its advantages. I have found that the advantages of hydrous oxide and polycarboxylic acid membranes can be combined by forming a hydrous oxide sublayer, exposing it at acidic pH to a feed containing a polycarboxylic acid, and then adding base to bring the feed to a neutral range, e.g., to a pH in the range 5 to 10. The resulting "dual-layer" membrane eliminates the disadvantages of the component single layers while retaining the best features of both. Representative embodiments of this invention illustrating how the process and product aspects of this invention may be practiced and how its advantages may be realized will be found in the following examples.

Example I

In this and succeeding examples, experimental apparatus used to form the membrane and test its salt rejection ability consisted of a closed loop. In many cases the membrane was formed on nylon filter fabric impregnated with a copolymer of vinyl chloride and acrylonitrile, the average pore size as specified by the manufacturer being 0.45 micron (Acropor AN450, Gelman Instrument Company). This fabric was wrapped around a porous stainless steel section, having an average pore size in the range of 5 to 10 microns, which was enclosed in a transparent pressure jacket. Aqueous feed was circulated under pressure through the annulus between the wrapped stainless steel tube and the jacket, with product water being collected from the inside of the porous tube. The aqueous feed contained membrane-forming materials. Rejections were determined from conductivity measurements on the feed and transpirated product. Membranes were formed and tested at a pressure of 1000 p.s.i.g. and a temperature of 25° C.

In this first example a comparison was made between a hydrous zirconium oxide single-layered membrane and the dual-layer hydrous (zirconium) oxide-polyacrylate membrane. The hydrous zirconium(IV) oxide membrane formed on 0.45µ Acropor at 37 ft./sec. (right two columns of Table I) from a colloidal dispersion filtered out 62 percent of the salt from a 0.05 M sodium chloride solution. At pH 6, rejection of the zirconium(IV) membrane dropped. Rejection remained low after addition of neutralized polyacrylic acid (sodium polyacrylate). However, on adding acid to reach a solution pH of about 2.7 and then base to bring the pH back to 5.6, rejection rose dramatically to a much higher value, 82 percent, than the single (zirconium oxide) layer.

In addition, Table I summarizes the results of carrying out hyperfiltration through a wide range of acidity.

TABLE I

Hyperfiltration Properties of a Hydrous Zr(IV) Oxide-Polyacrylate Membrane (0.05 M NaCl; 1,000 p.s.i.g.)

| | 0.025μ Millipore,[a] 37 ft./sec. | | 0.45μ Acropor AN | | | | | |
|---|---|---|---|---|---|---|---|---|
| | | | 14 ft./sec. | | 28 ft./sec. | | 37 ft./sec. | |
| pH | $\tilde{R}_{obs}$,[b] percent | Flux, g.p.d./ft.² | $\tilde{R}_{obs}$, percent | Flux, g.p.d./ft.² | $\tilde{R}_{obs}$, percent | Flux, g.p.d./ft.² | $\tilde{R}_{obs}$, percent | Flux, g.p.d./ft.² |
| | | | 0.001 M Zr(IV) | | | | | |
| 3.1 | 73 | 35 | 59 | 360 | 59 | 380 | 62 | 630 |
| 6.0 | 43 | 40 | 31 | 290 | 30 | 420 | 32 | 690 |
| | | | 20 p.p.m. PAA | | | | | |
| 5.6 | 29 | 45 | 9 | 440 | 11 | 440 | 23 | 700 |
| 2.7 | 49 | 17 | 52 | 280 | 51 | 300 | 53 | 370 |
| 5.6 | 85 | 17 | 68 | 175 | 69 | 175 | 82 | 210 |
| 8.3 | 75 | 24 | 66 | 150 | 74 | 145 | 85 | 180 |
| | | | After operation overnight | | | | | |
| 7.6 | 73 | 30 | 65 | 155 | 69 | 170 | 80 | 240 |
| 10.8 | 73 | 30 | 67 | 145 | 69 | 160 | 81 | 210 |
| 7.7 | 69 | 35 | 58 | 185 | 61 | 210 | 74 | 300 |

[a] A commercially available filter aid material.

[b] $R_{obs} = 1 - \frac{C_w}{C_f}$ where $C_w$ = concentration of salt in product and $C_f$ = concentration of salt in feed.

In Table I, the first row gives the rejection and flux obtainable with this membrane. The second row gives the properties of the single-layer hydrous oxide membrane after rinsing out the membrane-forming solution with 0.05 M sodium chloride to a pH of 6, and it will be seen that the higher pH is reflected by a marked decrease in salt rejection. The data in the third row was taken after the addition of 20 parts per million (p.p.m.) of polyacrylic acid having a molecular weight of about 300,000. The fourth and fifth rows indicate the effect of a pH cycle into the acid range with return to a more neutral pH, showing the heightened rejections which result in the relatively neutral pH region. High rejections were recorded even at a pH as high as 10.8, although some degeneration in rejection can be seen when the pH was lowered to a 7.7 operating condition. In any event, the data dramatize the high rejections and transpiration fluxes obtainable with a dual-layer membrane at neutral and near-neutral pH conditions.

Example II

Of even more practical importance is the performance of the dual membrane with feed solutions of compositions typical of natural waters, containing sulfate, magnesium, and calcium in addition to sodium and chloride ions. Table II below summarizes the salt rejection quality of a single-layer polyacrylate membrane (Sachs et al., op. cit.) in comparison to that obtained with a dual-layer hydrous oxide-polyacrylate membrane. The single-layer membrane was supported on a 0.3μ ceramic tube; it was mentioned earlier that it is difficult to form single-layer membranes on many supports, and 0.45μ Acropor is one of them. Not only were rejections poorer with the single layer (Table II) than with the dual layer, but production rates were only 5 to 8 g.p.d./ft.³ for the single layer, while they were from 23 to 35 g.p.d./ft.² for the dual layer. At the low fluxes through the single layer, concentration polarization should not seriously affect $\tilde{R}_{obs}$

TABLE II

Hyperfiltration of Feeds Approximating Natural Waters With Dynamically Formed Polyacrylate Membranes, With and Without Hydrous Zr(IV) Oxide Sublayers (1,000 p.s.i.g., tubular configuration)

| | Without Zr(IV) oxide sublaber (5 ft./sec.), $\tilde{R}_{obs}$, percent | | | With Zr(IV) oxide sublaber (35 ft./sec.), 0.45μ Acropor An, $\tilde{R}_{obs}$, percent | | |
|---|---|---|---|---|---|---|
| Feed | Chloride | Total anion | Mg²⁺+Ca²⁺ | Cl | Total anion | Mg²⁺+Ca²⁺ |
| Coalinga: | | | | | | |
| 1X | 53 | 60 | 66 | 81 | 91 | 99 |
| 3X | 47 | 56 | 63 | 77 | 92 | 98 |
| Foss reservoir, 2X | 33 | 39 | 40 | 70 | 86 | 90 |
| Dalpra farm: | | | | | | |
| 1X | | 58 | | | | |
| 2X | | | | 78 | 92 | 98 |
| Sea water | 35 | 38 | 40 | 72 | 63 | 78 |
| 0.05 M NaCl | 80 | | | 92 | | 88 |

NOTE.—Coalinga (1X: 0.0028 M NaHCO₃, 0.0096 M Na₂SO₄, 0.0018 M CaCl₂, 0.0020 M MgCl₂); Foss reservoir (1X: 0.005 M MgSO₄, 0.005 M CaSO₄, 0.0014 M NaCl, 0.0026 M NaHCO₃); Dalpra farm (0.008 M NaHCO₃, 0.019 M Na₂SO₄, 0.003 M MgSO₄, 0.003 M CaCl₂, 0.00004 M FeCl₃, 0.00002 M MnCl₂); Sea water (0.47 M NaCl, 0.03 M MgSO₄, 0.04 M MgCl₂, 0.002 M NaHCO₃).

It is seen that the performance of the dual-layer membrane surpasses the single-layer hydrous oxide membrane both in terms of anion and polyvalent counterion (Mg²⁺ and Ca²⁺) rejection for treatment of brackish water types such as Coalinga, Foss reservoir, and Dalpra farm, as well as sea water.

It is not necessary to introduce the polyacrylate in the salt form, but only to expose the hydrous oxide sublayer to polyacrylic acid under acid conditions below a pH of about 4. The mechanism appears to be that a fraction of the carboxyl ions, ionized even at acid pH, become attached to anion exchange sites of the hydrous oxide and the resulting attachment is not broken on adding base unless high pH values, of the order of 11 for hydrous zirconium oxide, are reached. On raising the pH, the attached polyacrylic acid is converted to the salt form, and ion exchange capacity and salt rejection increase. At high alkalinity, i.e., at a pH of ~11, salt rejection decreases by apparent loosening of the polyelectrolyte from the hydrous oxide, but high rejection levels can be restored by a cycle through an acidic pH.

In the preceding description, the dual hydrous oxide-polyacrylate membrane was formed by first depositing the hydrous oxide on a microporous surface at an acid pH of about 3 after which a solution of polyacrylic acid was passed over the hydrous oxide membrane at an acid pH to form the desired dual-layer membrane, whereupon the pH was increased to about 8 by successive base (usually sodium hydroxide) additions. I have found that a mixed membrane of favorable properties can also be formed by depositing both hydrous oxide and polyacrylic acid on porous supports from a single stock solution, as shown in the following example.

Example III

A colloidal stock solution can be prepared by adding 0.005 mole of $ZrOCl_2$ dissolved in 500 cc. of water to 500 cc. of a polyacrylic acid solution containing about 0.07 equivalent. In an alternate preparation, zirconium is converted to colloidal form by boiling 0.25 M zirconium oxychloride for about a day. Twenty cc. of this concentrated hydrous Zr(IV) oxide collidal solution was diluted to 500 cc. with water and added to 500 cc. of solution containing 0.07 equivalent of polyacrylic acid. Membranes formed on the inside of a porous carbon tube from a 0.05 M sodium chloride solution containing the first Zr(IV)-polyacrylate mixture. At a pH of about 3.3, salt rejection was 17 percent at a flux of 360 g.p.d./ft.$^2$, achieved within a period of about 30 minutes (1000 p.s.i.g.). After operating at acid pH, the surface of the dual-layer membrane was rinsed with fresh 0.05 M sodium chloride solution and base added until a pH of 7.6 was reached. Salt rejection at this pH was 86 percent at a flux of 60 g.p.d./ft.$^2$. Rejections were similar, but fluxes higher, with the alternate colloidal Zr(IV)-polyacrylate mixture. At a pH of 8.5, salt rejection was 78 percent at a flux of 155 g.p.d./ft.$^2$.

The ratios of polyacrylic acid to Zr(IV) are not critical, but the number of equivalents of acid should be substantially in excess of the number of moles of Zr(IV).

In the preceding examples there have been illustrated representative embodiments of the inventive concept of a dual-layer hyperfiltration membrane as represented by a hydrous zirconium oxide sublayer deposited on a microporous support followed by the deposition of polyacrylic acid. In its broader terms, however, the invention includes within its scope the use of any hydrous oxide capable of forming an apparent chemical bond with an organic polyanionic electrolyte. That a chemical bond is formed is evidenced by the fact that the polyelectrolyte layer is not washed away even at moderately basic solutions. Among the hydrous oxides useful in forming the sublayer of a dual-layer hyperfiltration membrane are those basic enough to be in anion exchange form at pH values about one or above; for example, Zr(IV), Th(IV), Fe(III), and Sn(IV). The choice of the organic polyelectrolyte constituent of the dual-layer hyperfiltration membrane may be selected from polyacrylic acid, polymethacrylic acid, polymaleic acid, and other polymers containing a linear charge density of carboxylate groups. In general, other things being equal, higher linear charge density corresponds to better performance. The term "linear charge density" is used here to denote frequency of occurrence of ionizable groups along the polymer chain, and does not imply that polymers containing crosslinks are unsuitable. Not all polyanionic electrolytes appear to be effective in forming the desired dual membranes by the procedures described here. For example, membranes formed from organic polyelectrolytes which have strong acid substituents, such as sulfonic acid groups, are not improved by a hydrous oxide sublayer. The selection of the cation exchange constituent of the dual-layer membrane for the techniques disclosed would appear to be limited to polyelectrolytes having weak acid radicals.

It should be understood that the invention does not reside in the particular porous support for the dual layer. Any support on which a hydrous oxide membrane can be formed is suitable. Average pore sizes up to 1.2 microns are suitable, and the preferred range is from this size down. Larger pore sizes up to 20 microns can be advantageously used, particularly when one wishes to have an option to remove the membrane by backwashing, by pretreatment with fine inert particulates (filter aids) to form a thin layer of small, effective pore size on which to form the membrane (J. S. Johnson, Jr., K. A. Kraus, S. M. Fleming, H. D. Cochran, Jr., and J. J Perona; Desalination 5, 359 (1968)).

What is claimed is:

1. An improved hyperfiltration process which comprises depositing a hydrous oxide layer on one surface of a microporous cylindrical support having pores in the range 0.025 to 20 microns, depositing an organic polyelectrolyte having weak acid functional groups on the hydrous oxide layer, exposing the resulting dual hydrous oxide-polyelectrolyte layer to an acid pH lower than about 4 and then to a pH in the range 5.6 to 10.8, circulating an aqueous feed containing alkali and alkaline earth cations past said dual layer at a pressure sufficient to force a liquid through said dual-layer membrane and support to produce a product solution depleted in said cations.

2. The process according to claim 1 in which the hydrous oxide is selected from the group consisting of Zr(IV), Th(IV), Sn(IV), and Fe(III).

3. The process according to claim 1 in which the dual layer is deposited on the cylindrical support from a common solution.

4. The process according to claim 1 in which the organic polyelectrolyte is an organic polymer containing carboxylic acid groups.

References Cited
UNITED STATES PATENTS

| | | | |
|---|---|---|---|
| 3,449,245 | 6/1969 | Johnson et al. | 210—500 X |
| 3,462,362 | 8/1969 | Kollsman | 210—23 |
| 3,503,789 | 3/1970 | Johnson et al. | 210—506 X |

FRANK A. SPEAR, Jr., Primary Examiner

U.S. Cl. X.R.

210—321